United States Patent
Tumblin et al.

(12) 
(10) Patent No.: US 6,490,679 B1
(45) Date of Patent: Dec. 3, 2002

(54) SEAMLESS INTEGRATION OF APPLICATION PROGRAMS WITH SECURITY KEY INFRASTRUCTURE

(75) Inventors: Henry R. Tumblin, Malden, MA (US); Michael S. Rothman, Vienna, VA (US); Fred J. Pinkett, Ashland, MA (US); James M. Geary, Medfield, MA (US); Steve R. Artick, Burlington, MA (US)

(73) Assignee: Shym Technology, Inc., Waltham, MA (US)

( * ) Notice: Subject to any disclaimer, the term of this patent is extended or adjusted under 35 U.S.C. 154(b) by 0 days.

(21) Appl. No.: 09/232,977

(22) Filed: Jan. 18, 1999

(51) Int. Cl.[7] .............................. H04L 9/00; H04L 12/22
(52) U.S. Cl. ........................................ 713/155; 713/201
(58) Field of Search ................................. 713/200, 201, 713/155, 156, 229; 709/223, 225

(56) References Cited

U.S. PATENT DOCUMENTS

| | | |
|---|---|---|
| 5,032,979 A | 7/1991 | Hecht et al. |
| 5,164,988 A | 11/1992 | Matyas et al. |
| 5,481,720 A | 1/1996 | Loucks et al. |
| 5,534,855 A * | 7/1996 | Shockley et al. .......... 340/5.52 |
| 5,544,322 A | 8/1996 | Cheng et al. |
| 5,655,077 A | 8/1997 | Jones et al. |
| 5,689,565 A * | 11/1997 | Spies et al. .................. 713/189 |
| 5,745,574 A * | 4/1998 | Muftic ........................ 713/157 |
| 5,774,551 A | 6/1998 | Wu et al. |
| 5,790,800 A | 8/1998 | Gauvin et al. |
| 6,012,100 A * | 1/2000 | Frailong et al. ............. 709/250 |

OTHER PUBLICATIONS

Schneier et al., A Peer–To–Peer Software Metering System, Second USENIX Workshop on Electronic Commerce Proceedings, USENIX Press, pp. 229–286, Nov. 1996.

* cited by examiner

Primary Examiner—Gilberto Barrón
(74) Attorney, Agent, or Firm—Fish & Richardson P.C.

(57) ABSTRACT

The invention is a method and system for integrating a security key infrastructure with applications programs on a computer system. A security key infrastructure service request is transmitted from a first application program to a security integration module. In the security integration module, a first policy is requested from a policy server and a first security key infrastructure is selected to service the security key infrastructure service request, according to the first policy. The security key infrastructure service request is transmitted from the security integration module to the selected first security key infrastructure.

4 Claims, 14 Drawing Sheets

SEAMLESS INTEGRATION OF APPLICATION PROGRAMS WITH SECURITY KEY INFRASTRUCTURE

BACKGROUND OF THE INVENTION

The continued growth of digital communication has created an increasing need to make such communications secure and verifiable. One way to achieve these goals is through the use of a security key infrastructure (SKI). An SKI is a set of services enabling the use and management of a key based security system providing the underlying technology for authentication, privacy and non-repudiation of digital communications.

In an SKI based security system, every relevant entity (e.g. user, organization, network node) is assigned a unique secret key (typically a very large random number). The key is considered to be the "credentials" of the entity to which it is assigned, and an entity can prove its identity by proving that it "possesses" its secret key. This can be done, for example, by performing certain mathematical functions on digital documents using the secret key to produce a so-called "digital signature," which can be used both to authenticate the source of the document, and to prevent the entity which "signed" it from repudiating its signature later on.

An SKI can be used to establish a temporary secure and trusted connection (a "session") between a client and a server as follows. The client uses procedures in the SKI to generate a "session token" which is mathematically related to the secret key of the client (or of the user working on the client), and which also includes an encrypted "session key." The session token is then sent to the server, along with a request to establish a secure connection. The server uses procedures in the SKI which can test whether the session token has the appropriate mathematical relationship to the secret key of the putative sender of the request, thus enabling the server to test the authenticity of the request. The client may also use procedures in the SKI to extract the session key from the session token. Since the session key is known only to the client and the server, it can be used as an encryption key to establish an encrypted communication channel between the client and the server.

Examples of SKIs include so-called symmetrical key infrastructures, such as the Kerberos system, described in the document RFC1510 available from the Internet Engineering Task Force, and so-called public key infrastructures (PKIs) such as Entrust/PKI, available from Entrust, Inc., and described at http://www.entrust.com/entrust/index.htm, and OnSite, available from Verisign, Inc. and described as http://www.verisign.com.

A PKI is an SKI that utilizes public key cryptography, in which entities are assigned two keys, one public and one private. The two keys have a mathematical relationship such that data encrypted by one key can only be decrypted using the other key, and vice versa. An entity can therefore encrypt information using its private key, and send it to a recipient who can decrypt it using the entity's public key. This permits the recipient to authenticate the identity of the sender without ever having to learn its private key, so long as the recipient can be assured of the sender's public key. Conversely, information can be encrypted with an entity's public key, thus providing way of securing the data so that only the entity possessing the private key will be able to decrypt it.

One of the features of a PKI is that it provides a trusted third party or certificate authority (CA), which is a trusted source of information about public keys. A certificate authority issues digital "certificates" which attest to the assignment of a particular public key to a particular entity. The certificate is cryptographically "signed" by the CA, and this signature can be verified using the CA's public key. Thus, as long as the CA itself is trusted, recipients may rely on such certificates to authenticate sources of information.

For an organization to implement a PKI, it must either create an internal CA, or rely on a third party to provide one. Toolkits and products for creating CAs are available from vendors such as Entrust, Netscape, Microsoft and Xcert. Third party CA services are provided by vendors such as Verisign, GTE Cybertrust and CertCo.

One impediment to the widespread implementation of SKI systems is the problem of application support. SKI services are typically not accessed by users directly, but are instead called from within an application via an application programming interface (API). However an application can access an SKI only if it has been programmed to utilize the SKI's API. Because many legacy applications and applications on the market today have not been programmed for use with an SKI, an organization seeking to utilize an SKI system would need to spend considerable time and effort retrofitting existing systems to take advantage of SKI services.

An additional problem arises because there is no standard API which is provided by all of the various SKI systems available today. As a result, software vendors that do incorporate the ability to use an SKI in their products typically provide compatibility with only one SKI API, thus limiting customers in the choice of SKIs they may wish to employ.

The difficulty in employing an SKI in an existing networked computing environment may be better understood by reference to FIGS. 1–6.

Shown in FIG. 1 is a network computer system 100 having a network 110 that connects clients 120 and servers 130. Clients 120 include any device capable of receiving information from a user and transmitting digital data over network 110, including networked computer workstations, automatic teller machines, cable television receivers, PCS devices, and the like. Data servers include any device responsive to data requests received over network 110, including network file system file servers, internet web servers, database servers, and the like. Users therefore use clients 120 to access data or services provided by servers 130.

FIG. 2 is a schematic diagram of a client 120 and a server 130 connected to a network 110. A client 120 includes an input device 140, capable of receiving information from a user, and an output device 150, capable of providing information to a user. Client 120 contains client programs 160 which receive inputs from a user via the input device 140, and provide outputs to the user via output device 150. Client programs 160 communicate over network 110 with server programs 170 located on servers 130, which provide data or services in response to requests received from client programs 160. By using a client program 160 located on client 120, a user may therefore access data or services located on a server 130.

Client programs 160 and server programs 170 will be referred to collectively as "application programs." Referring now to FIG. 3, an application program 175 typically does not have the ability to access network hardware directly. Rather, they access the network 110 by using network access module (NAM) 180 provided by an operating system. The network access module 180 provides a network application program interface (network API) 190 that is recognized by each client program 160. For example, in a MICROSOFT WINDOWS 95(™) environment, application programs typically access a network through the Winsock network access module, which is provided as a dynamic load library (DLL) by the WINDOWS 95 operating system.

Client programs 160 are of two types, security extensible 200, and security non-extensible 210. Referring now to FIG. 4, security extensible client programs 200 may have a built-in security module 220, as in client programs 200a and 200b, which provides built-in security services for the client program. For example, the built-in security module 220 may provide authentication services by requiring a user to enter a password which can be checked against a password file maintained by the client program.

A security extensible client program 200 accesses its built-in security module 220 using a security services application program interface (security services API) 230, .such as the Generic Security Services API (GSS-API), described in the publication RFC2078 available from the Internet Engineering Task Force, the Common Data Security Architecture (CDSA), developed by Intel Corp. and described at www.intel.com/ial/security and www.opengroup.org/publications/catalog/c707.htm, or the Cryptographic Application Programming Interface (CAPI), described at www.microsoft.com/security/tech/cryptoapi. The security features of a program using a security services API are therefore extensible: built-in security module 220 can be replaced with an extension module that provides improved or extended security features using the same security services API 230.

Alternatively, a security extensible client program 200 may have no built-in security features, but may nonetheless be capable of requesting security services through a given security services API 230, as illustrated by client programs 200c and 200d. Such a program is able to provide security services if an appropriate extension module is linked to it.

The security services APIs 230 recognized by security extensible client programs 200 are not necessarily the same, as illustrated by the differing shapes used to represent security services APIs in FIG. 4.

Referring now to FIG. 5, a security non-extensible client program 210 may or may not provide built-in security features 215, however it is not extensible to provide additional security features because it does not recognize a security services API 230.

Like client programs 160, server programs 170 may be security extensible or security non-extensible.

FIG. 6 shows schematically a set of SKIs 260. Each SKI 260 includes a security services API 230, and a set of SKI services 270 that can be accessed through it. The security services APIs 230 provided by the SKIs 260 are not necessarily the same.

A system manager who wished to integrate one or more of the SKIs 260 shown in FIG. 6 with, for example, the client programs illustrated in FIGS. 4 and 5 would be faced with two difficulties. First, the system might include security extensible client programs 200 or security extensible server programs 240 that did not recognize the same security services API 230. In such a case, the system manager would have to install multiple SKIs 260 in order to provide SKI services 270 for all of the security extensible client programs 200 and server programs 240 on the system, and would not have the flexibility to use an SKI, such as SKI 260c in FIG. 6, having an API not recognized by any of the programs.

In addition, in the case of security non-extensible client programs 210 (or security non-extensible server programs), the system manager would not be able to link such programs to an SKI 260 without modifying the program itself, which could be quite time consuming and, where source code was not available, impractical.

SUMMARY OF THE INVENTION

The present invention provides a system and method for enabling security key infrastructure (SKI) resources to be easily integrated into a network computer system. The present invention further provides a system and method for providing secure and tamper-evident tracking of SKI service requests on a network computer system. The present invention further provides a system and method for authorizing user access to system resources on network computer system. The present invention further provides a system and method for integrating application programs lacking a security services API into a security framework utilizing SKI services.

In a first aspect, the invention provides a method for integrating a security key infrastructure. A security key infrastructure service request is transmitted from a first application program to a security integration module. In the security integration module, a first policy from a policy server is requested. In the security integration module, a first security key infrastructure is selected to service the security key infrastructure service request, according to the first policy. The security key infrastructure service request is transmitted from the security integration module to the selected first security key infrastructure.

In another aspect, the invention provides a method for securing a distributed data processing system having a client program on a client having a user, and a server program on a server connected to the client by a network, including, in the client, intercepting a request by the client program to open a network connection to a server program, determining whether the user is authorized to open the connection by reference to a policy associated with the user, sending a message requesting to the server to establish a network connection, only if the user is authorized by the policy to establish the connection.

In another aspect, the invention provides a method for auditing a security key infrastructure transaction including transmitting a security key infrastructure transaction request from an application program to a security integration modules the security integration module, selecting an appropriate security key infrastructure to perform the requested transaction, transmitting the request from the security integration module to the selected security key infrastructure, and storing in an audit log audit data related to the request.

DESCRIPTION OF THE PREFERRED EMBODIMENTS

Figure 1:
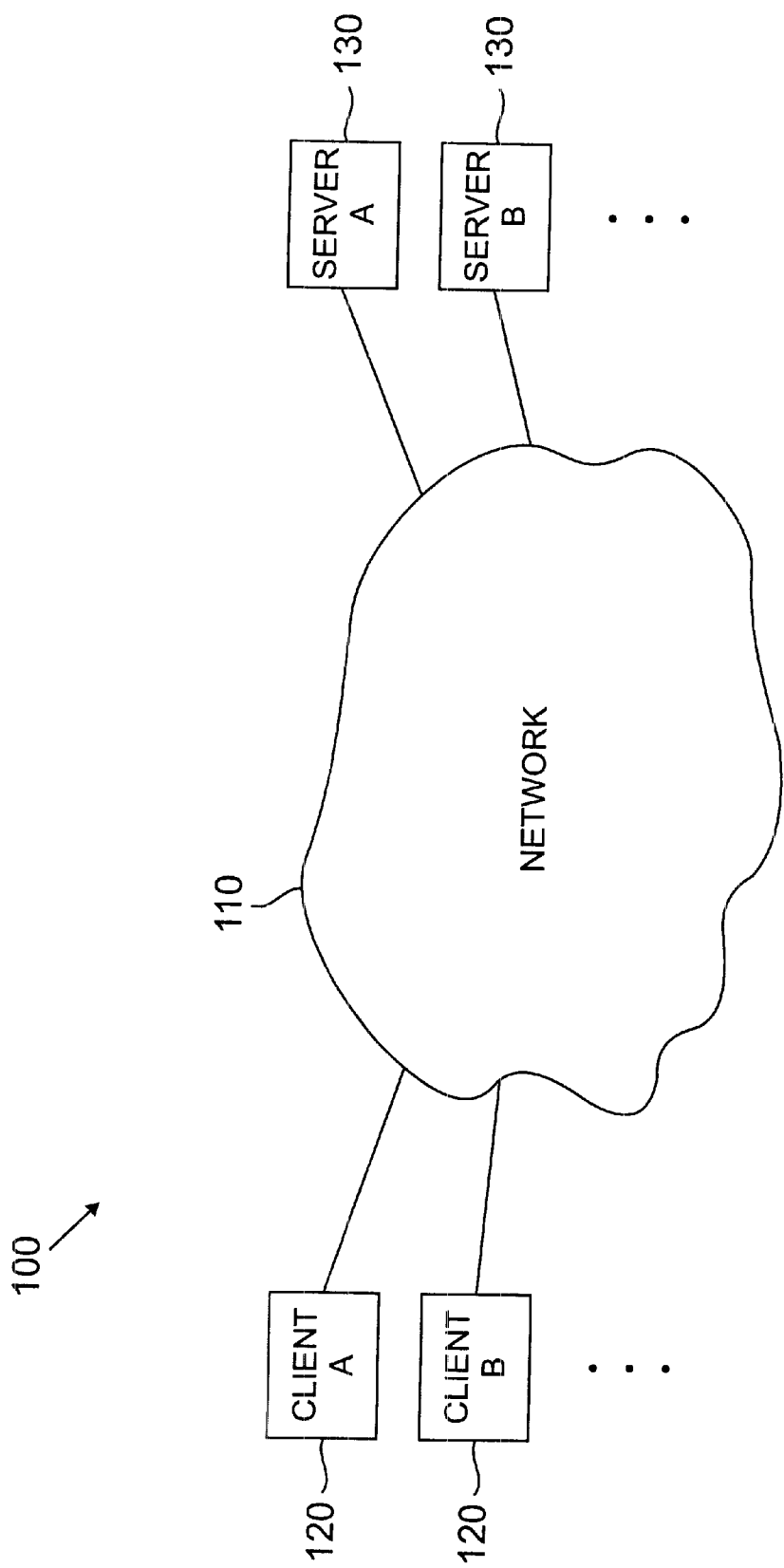
FIG. 1 is a schematic drawing showing a network computer system having clients and servers.
Figure 2:
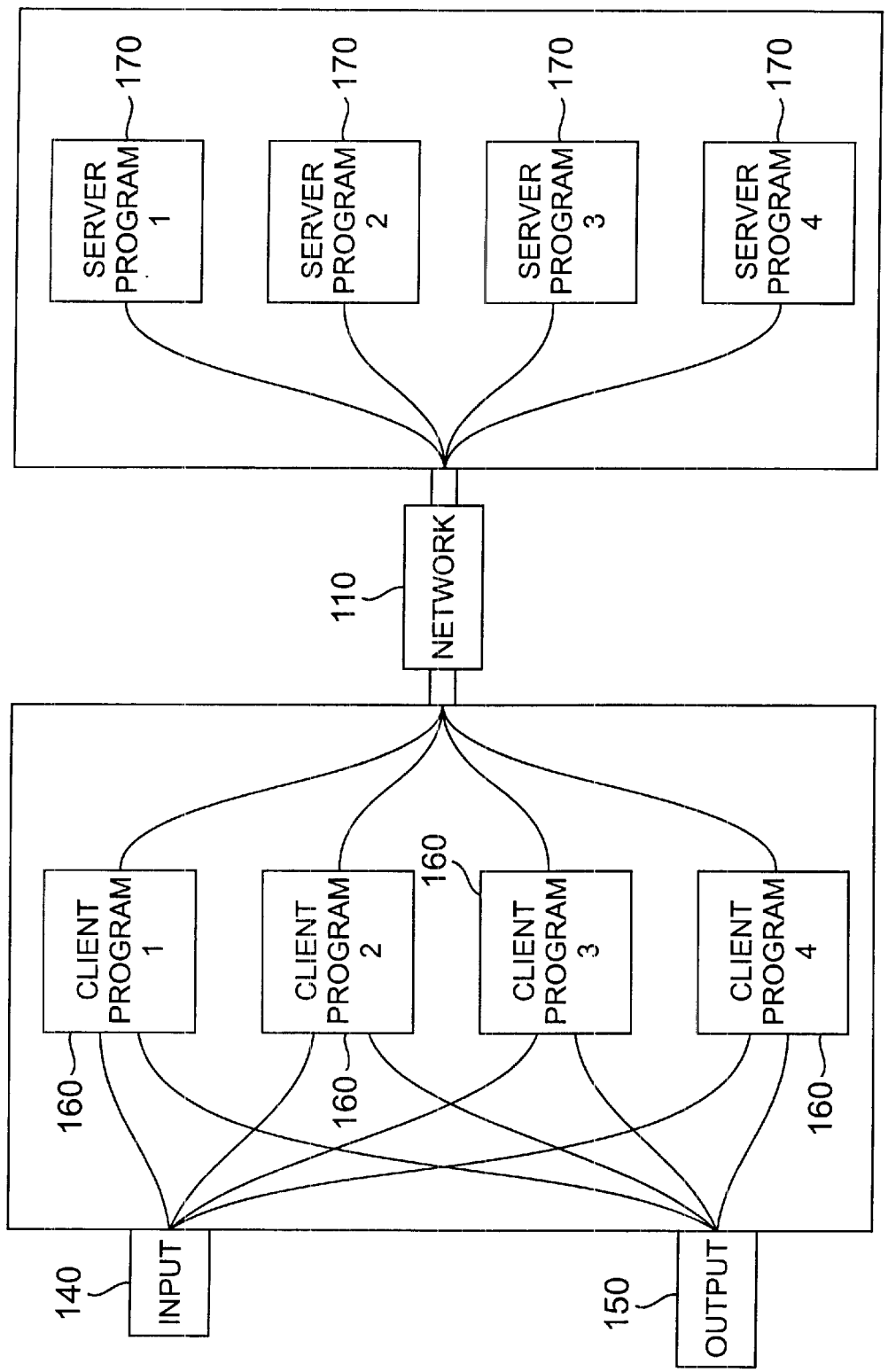
FIG. 2 is a schematic drawing showing communication between application programs in a client and a server.
Figure 3:
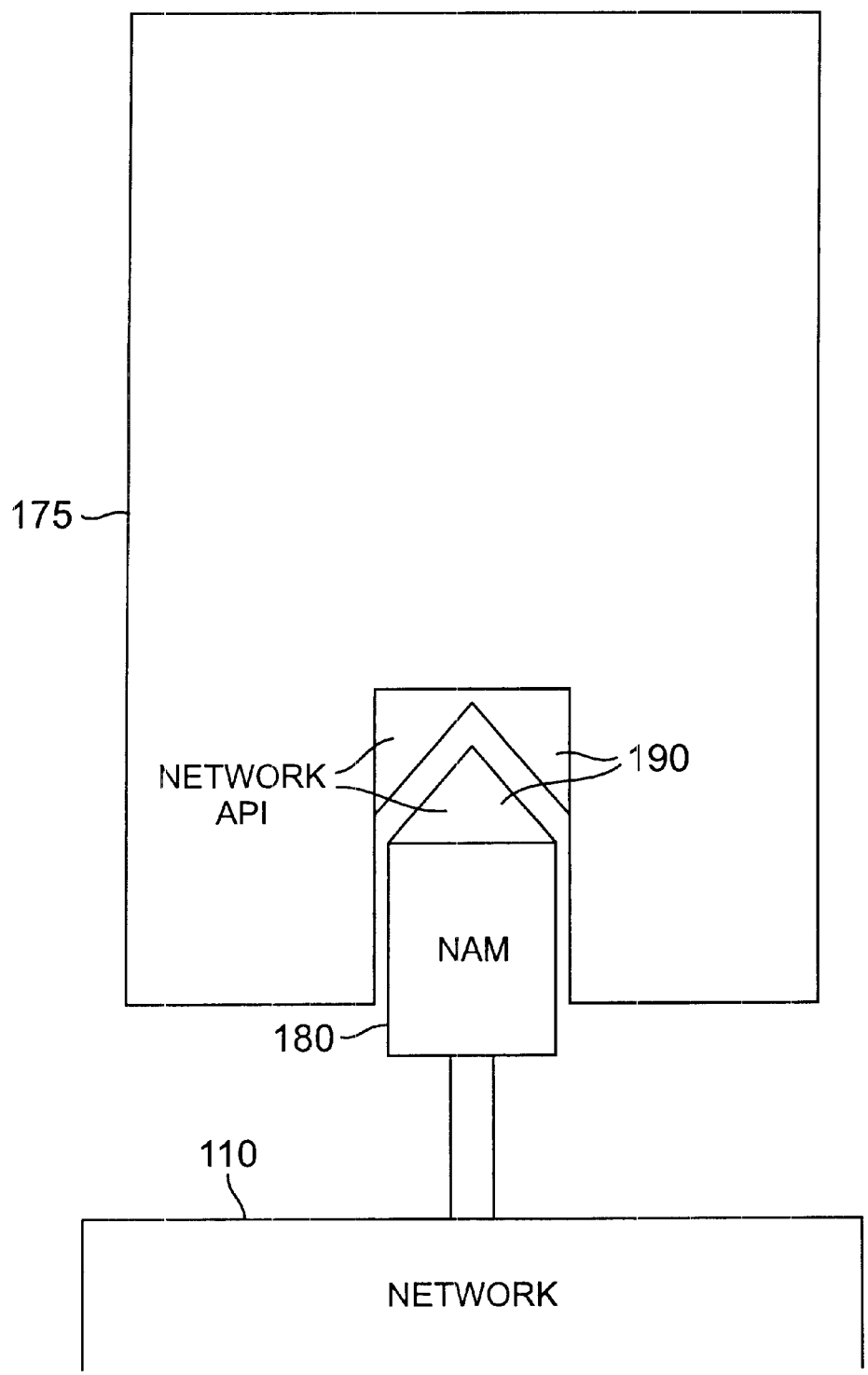
FIG. 3 is a schematic drawing showing an application program having a network API.
Figure 4:
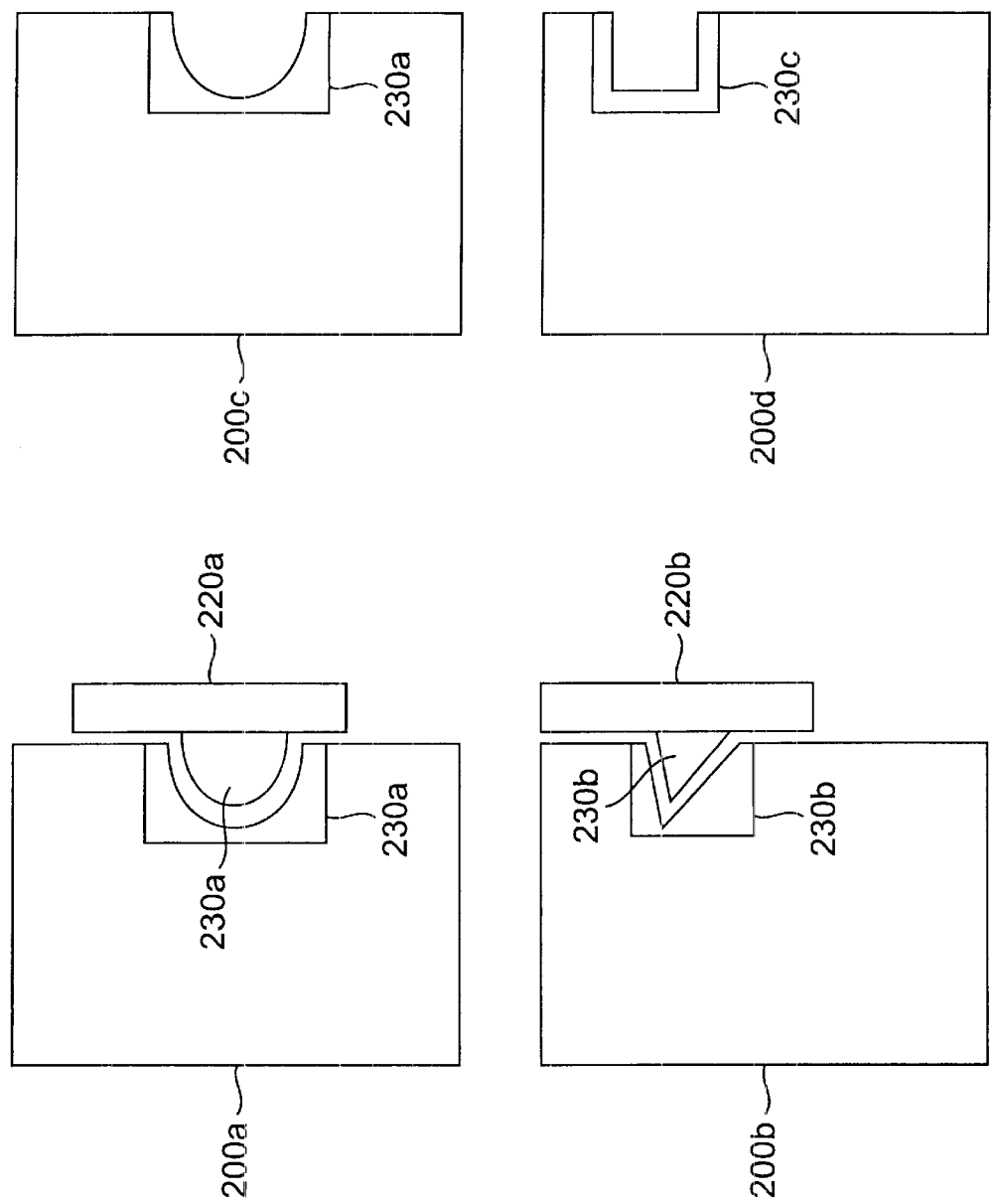
FIG. 4 is a schematic drawing showing security extensible client programs recognizing differing security services APIs.
Figure 5:
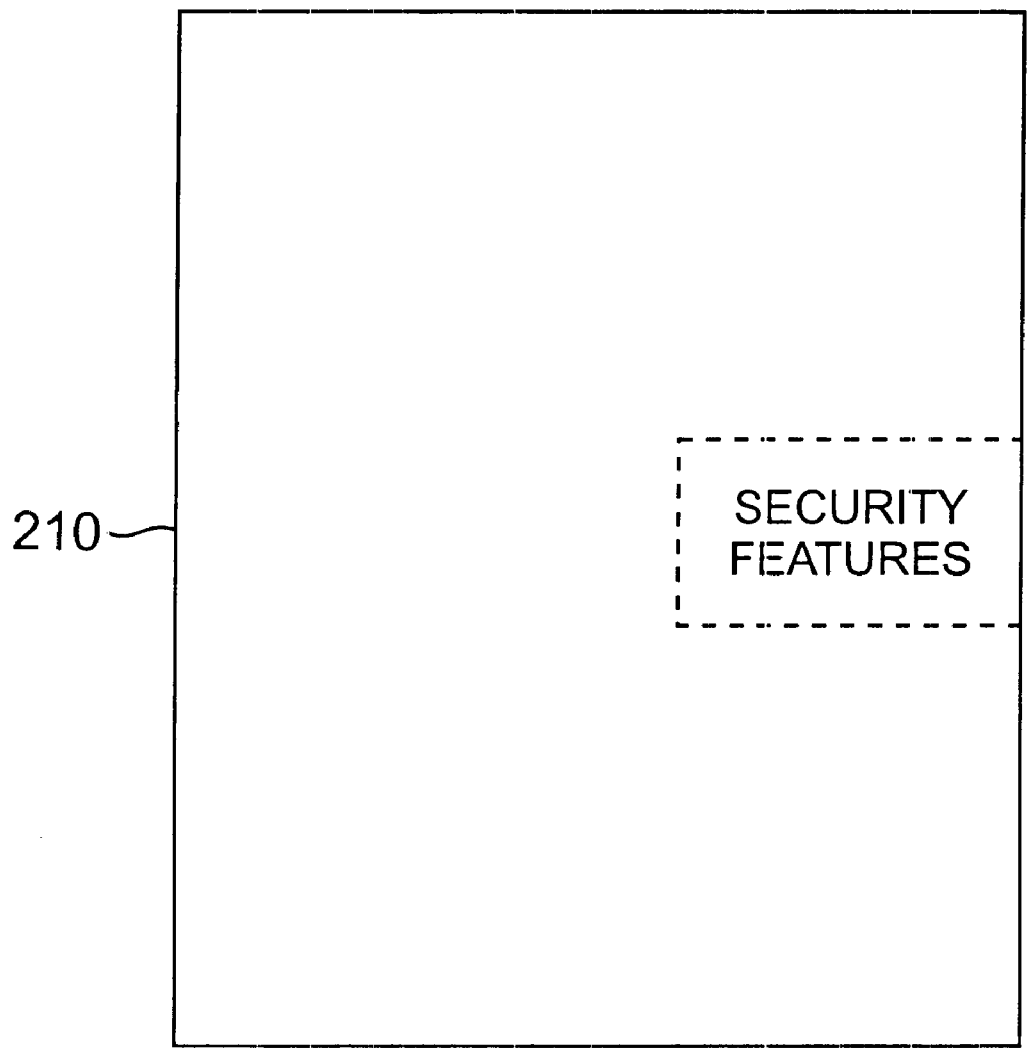
FIG. 5 is a schematic drawing showing a security non-extensible client program.
Figure 6:
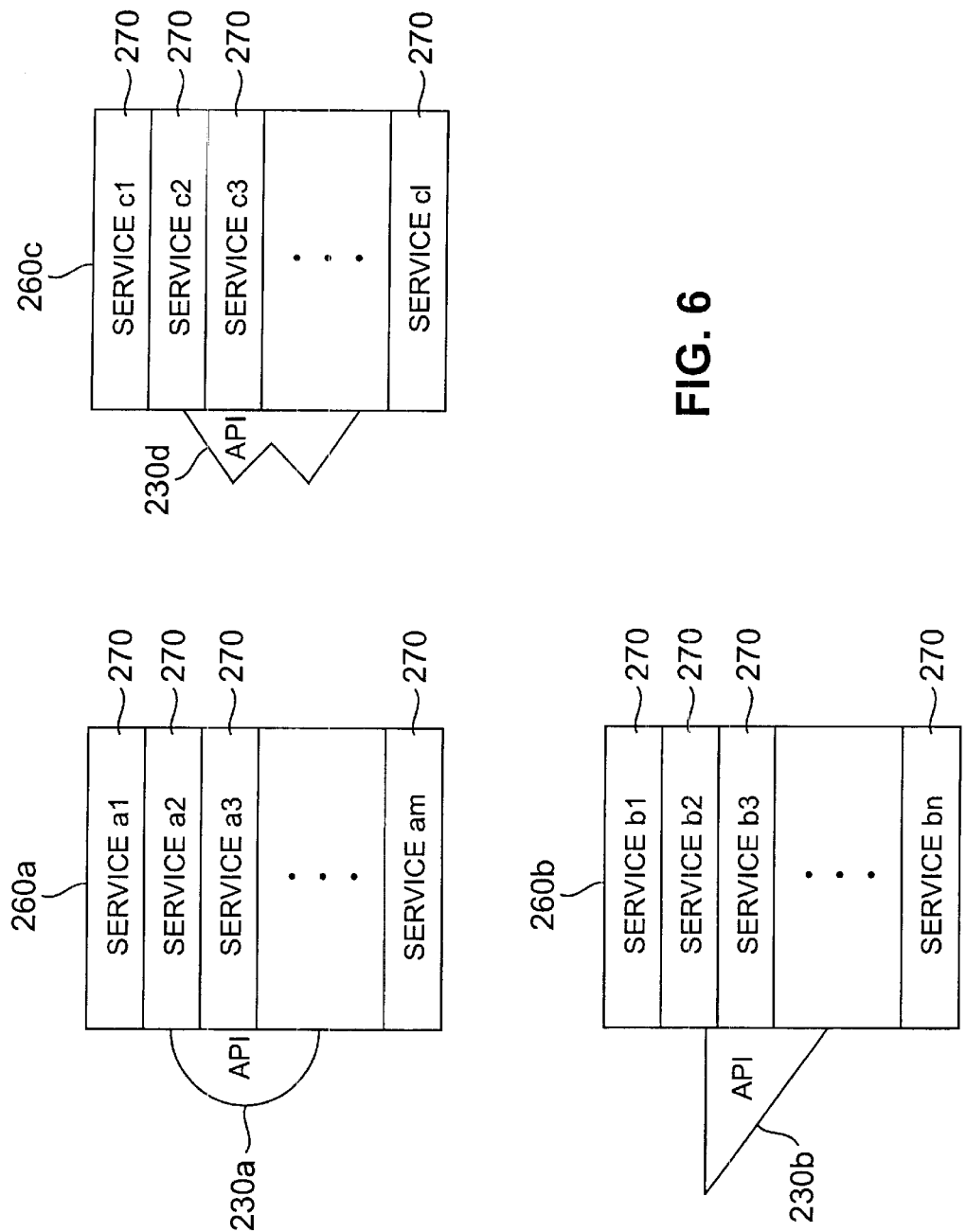
FIG. 6 is a schematic drawing showing security key infrastructures having differing security services APIs.
Figure 7:
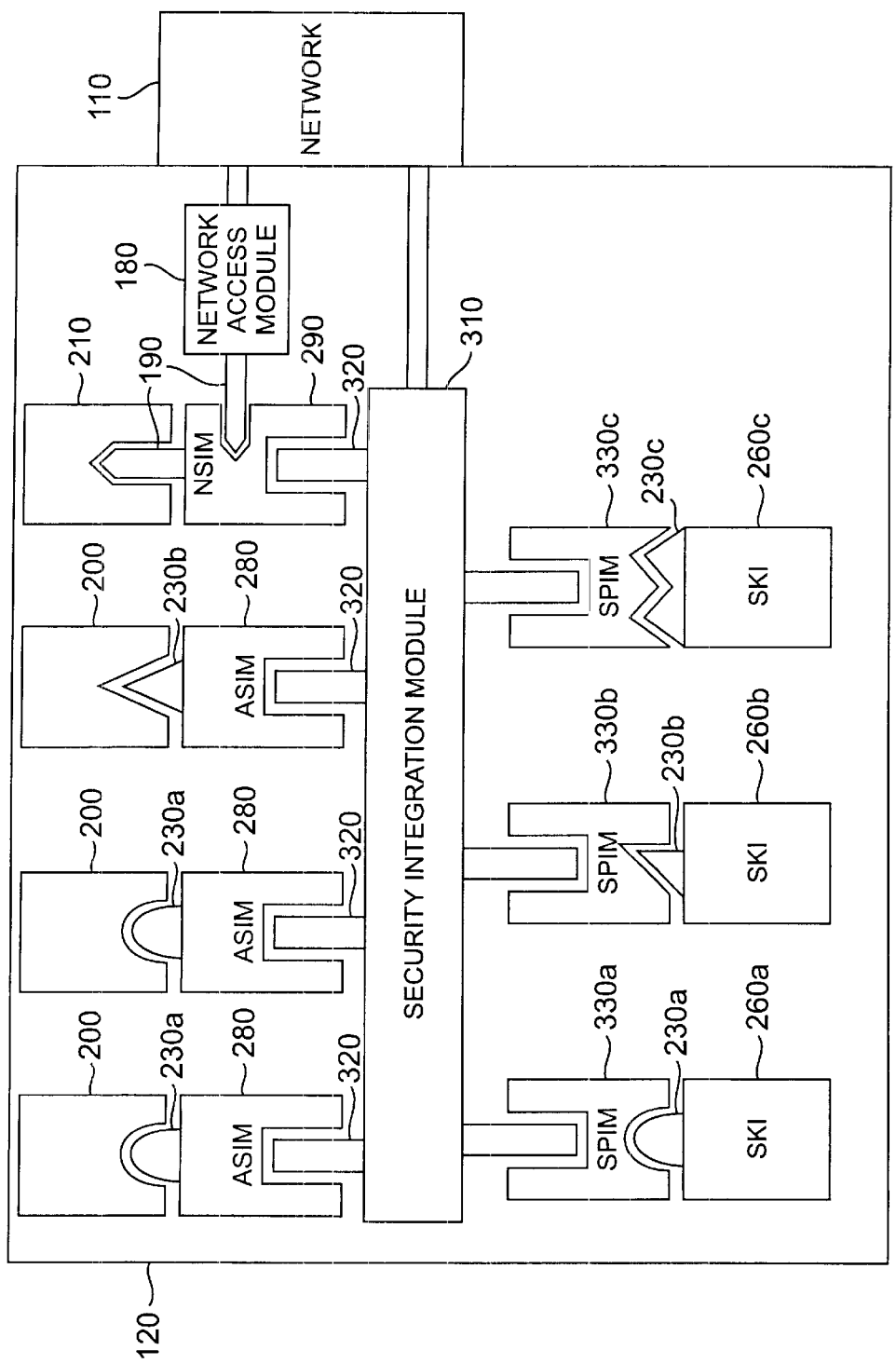
FIG. 7 is a schematic drawing showing a client configured according to the present invention.
Figure 8:
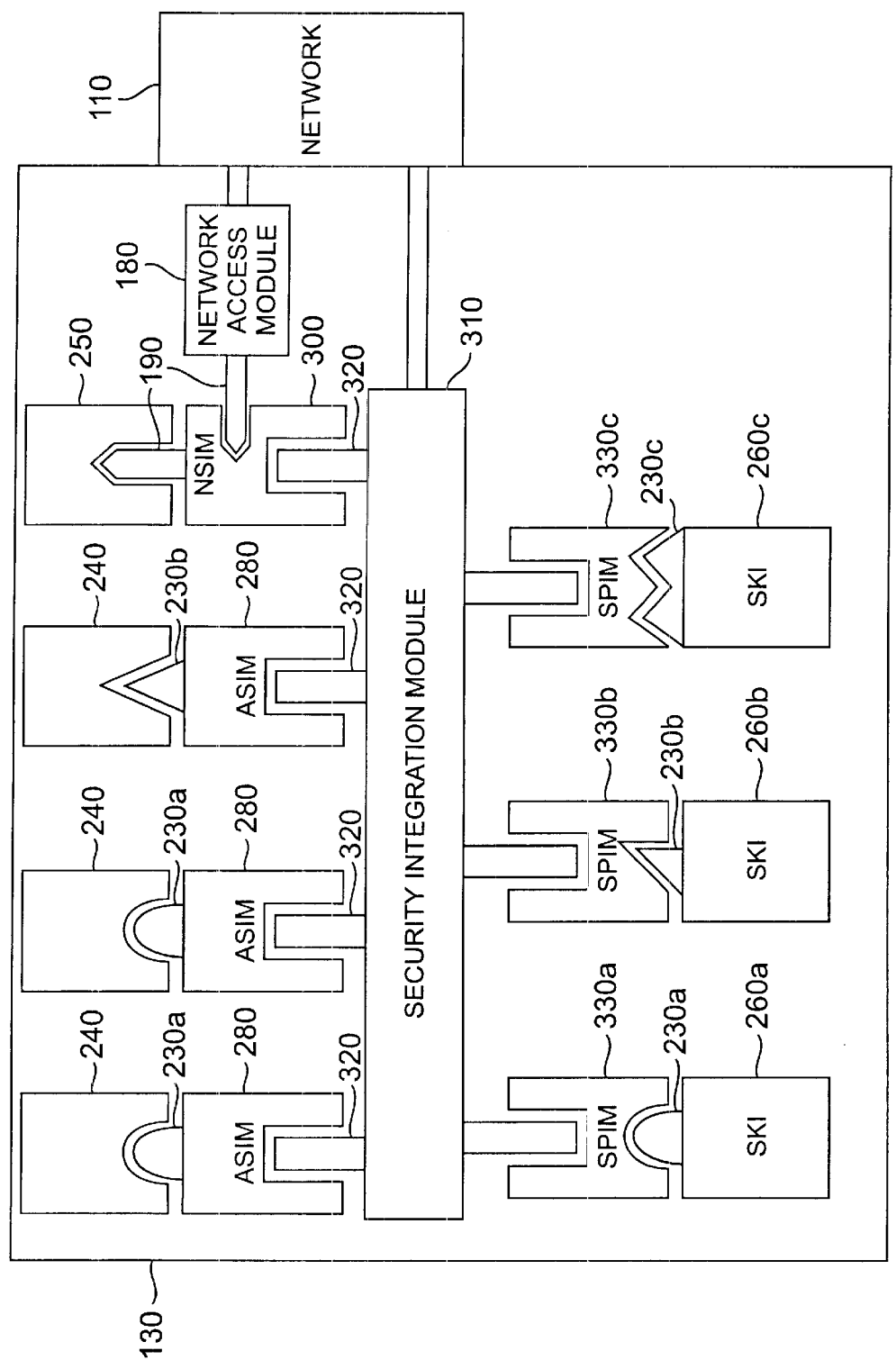
FIG. 8 is a schematic drawing showing a server configured according to the present invention.
Figure 9:
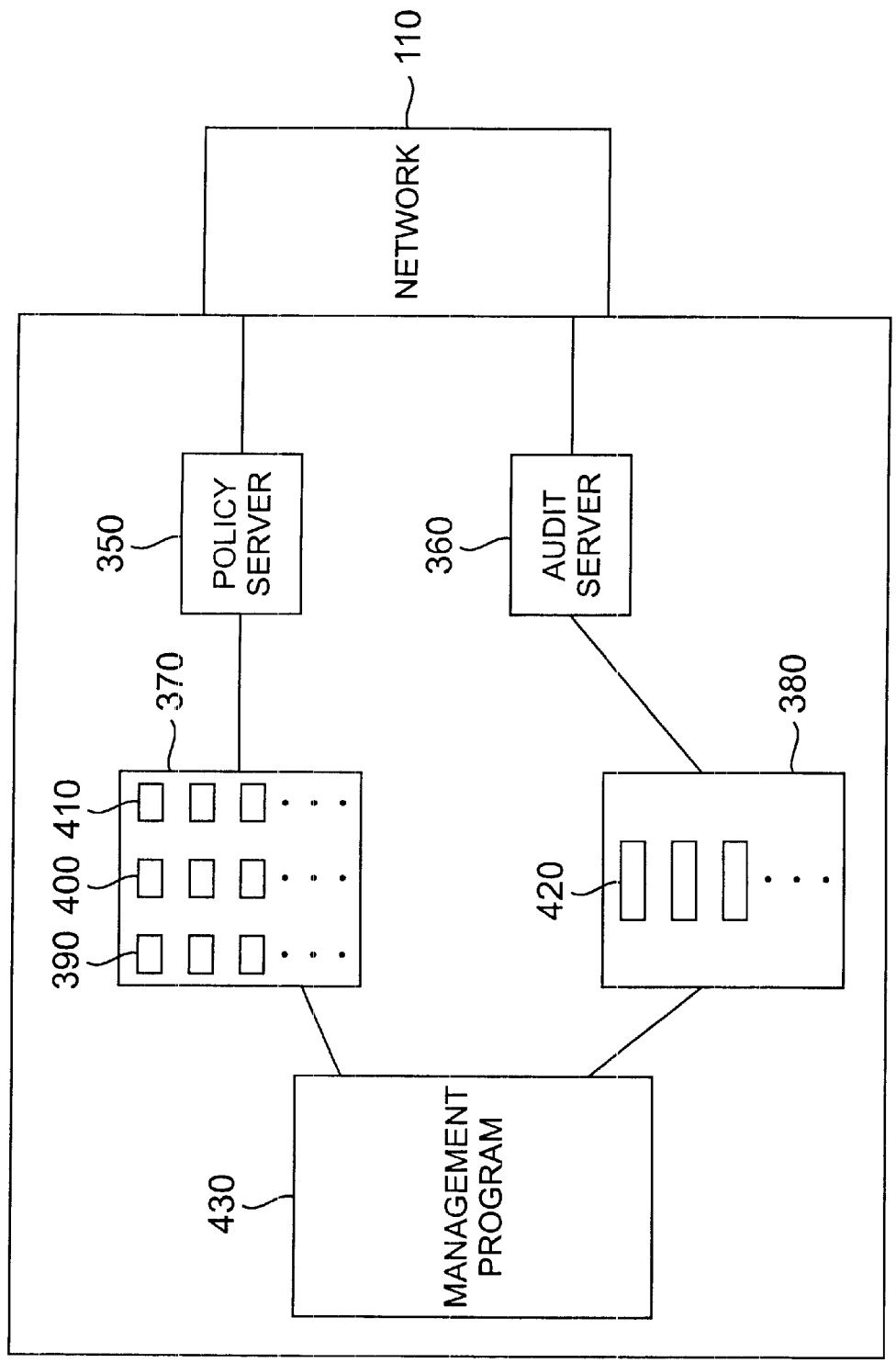
FIG. 9 is a schematic drawing showing a security integration server according to the present invention.

FIGS. 7, 8 and 9 show a network computer system 100 in which clients 120 and servers 130 are linked to SKIs 260 according to an embodiment of the invention.

In client 120, each security extensible client program 200 is linked to an application security interface module (ASIM) 280 using the security services API 230 recognized by the program 200. The ASIM replaces any built-in security module 220 formerly linked to the program 200. In each security non-extensible client 210, network access module 180 is replaced with a client network security interface module (client NSIM) 290. Each client NSIM 290 provides the network API 190 recognized by security non-extensible application 210. Each NSIM is in turn linked to a network access module 180, which also provides a network API.

Referring to FIG. 8, server 130 includes server programs 170, some of which are security extensible server programs 240 and some of which are security non-extensible server programs 250. Each security extensible server program 240 is each linked to an ASIM 280 through a security services API 230 recognized by the server program 240. Security non-extensible server programs 250 are each linked to server NSIMs 300, which are, in turn, linked to network access modules 180.

Referring to FIGS. 7 and 8, ASIMs 280, client NSIMs 290 and server NSIMs 300 in both the client and the server are all linked to a security integration module (SIM) 310. Each ASIM 280 is capable of receiving requests for SKI services 270 from the client program 200 or server program 240 to which it is linked, and forwarding those requests to the SIM 310 using an API which will be referred to as the SIM API 320.

Each client NSIM 290 and server NSIM 300 is capable of receiving requests for network services from the client program 210 or server program 250 to which it is linked, and forwarding those requests to the network access module 180 to which it is also linked. Each NSIM is also capable of making requests for SKI services 270 to the SIM 310 using the SIM API 320, but does not receive such requests from the security non-extensible client program 210 or server 250 to which it is linked.

Linked to each SIM 310 are security provider interface modules (SPIMs) 330. Each of the SPIMs 330 is linked, in turn, to an SKI 260. Each SPIM 330 is capable of receiving requests for SKI services 270 from SIM 310, and forwarding those requests to the SKI 260 to which it is linked, using the security services API 230 provided by that SKI 260.

FIG. 9 shows a security integration server 340 which is connected to network 110. Security integration server 340 includes policy server program 350 and audit server program 360. Policy server program 350 accesses policy database 370, and audit server program 360 accesses audit database 380. Policy database 370 stores program policies 390, user policies 400 and connection policies 410. Audit database stores audit records 420. Also included in security integration server 340 is management program 430, which has access to policy database 370 and audit database 380, and which can be used by an authorized manager to review or modify policies contained in the policy database 370 or to review the data in the policy and audit databases. Policy server program 350 is able to receive requests for specific policies from other hosts on the network 110, and to transmit requested policies from the policy database 370 to the requesting host in response to such requests. Audit server program 360 is able to receive audit records from other hosts on the network and store them in the audit database 420.

In particular, each SIM 310 in a client 120 or server 130 is capable of transmitting policy requests to policy server program 350 and audit records to audit server program 360 via network 110.

Figure 10:
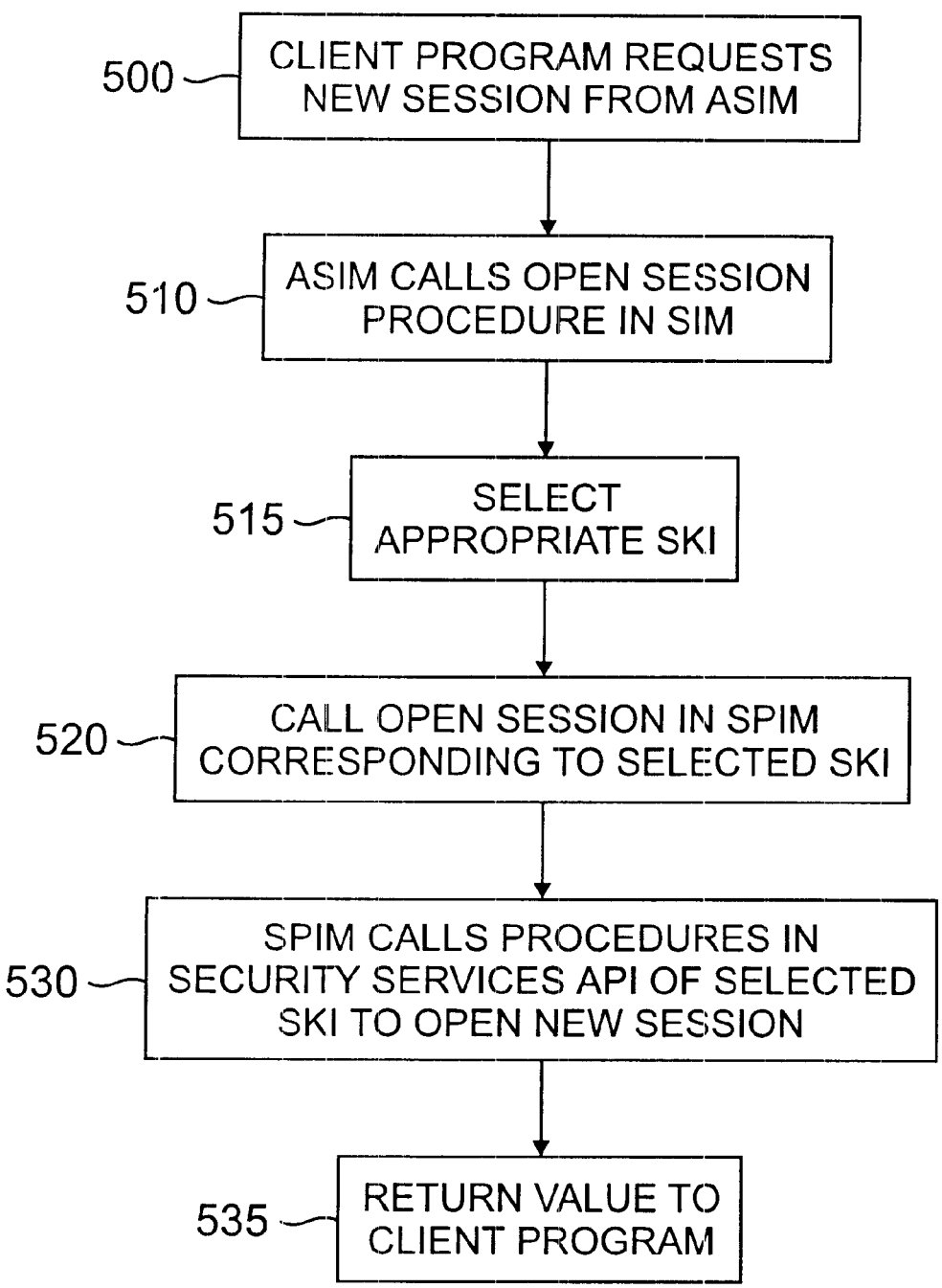
FIGS. 10–15 are flowcharts showing steps taken according to an embodiment of the present invention.

Now the steps by which security extensible client programs 200 and server programs 240 obtain SKI services 270 from SKIs 260 in the present invention will be now described. Referring to FIGS. 7, 8 and 10, the client program 200 on client 120 seeks to open a secure communications channel with a server program 240 on server 130. Client program 200 attempts to initiate a new communication session by calling the appropriate procedure in the security services API 230 provided by the application security interface module (ASIM) 280 to which it is linked (step 500).

ASIM 280 responds by calling an OpenSession procedure in the SIM API provided by SIM 310 (step 510). As arguments to the OpenSession procedure, ASIM 280 provides the SIM 310 with information necessary for an SKI 260 to commence a new communication session, including the username of the user and application name of the client making the request.

When an OpenSession request is received by the SIM 310, the SIM 310 determines an appropriate SKI 260 to handle the request (step 515), and forwards the request to a particular SPIM 330, corresponding to the selected SKI 260, by calling the OpenSession procedure in the SIM API provided by the SPIM 330 (step 520). The SPIM 330, in turn, requests that the SKI 260 with which it is associated open a new communication session by calling a procedure in the security services API provided by the SKI 260 to which it is linked (step 530).

The SKI 260 will return either a session token, indicating that the user's username was successfully authenticated, or an error message indicating that it was unable to authenticate the username (step 535). This information is returned to the client program 200 or server program 240 that initiated the request.

Once a security services session has been successfully established, additional requests for services within the session are directed by the SIM to the SKI 260 with which the session as opened.

Figure 11:
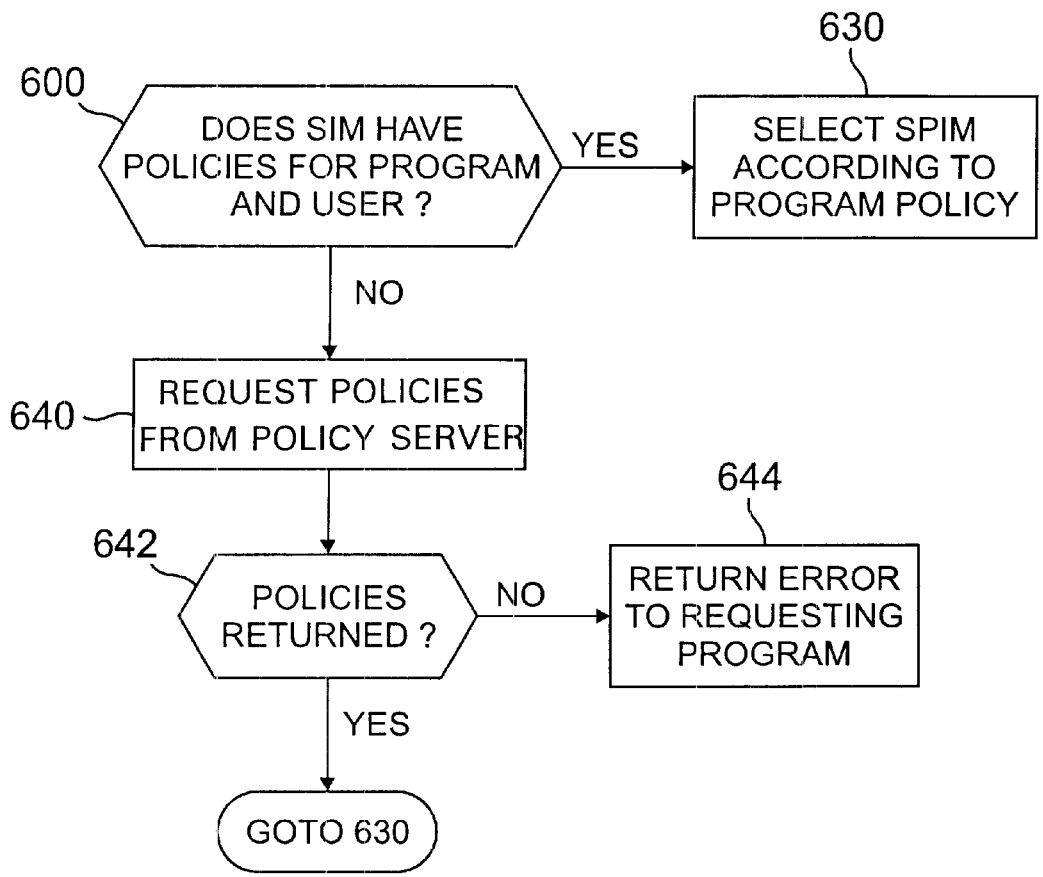

The method by which a SIM 310 responds to an OpenSession request will now be described in more detail, referring to FIGS. 7, 9, and 11. When an OpenSession request is received by the SIM 310, it receives as parameters the name of the requesting program and the name of the user making the request. The SIM determines whether it has a program policy 390 for the requesting program and a user policy 400 for the user (step 600).

A program policy 390 includes information that identifies the particular SKI 260 to be used to provide SKI services 270 for the program. A program policy 390 also includes an access control list, identifying the categories of users that have permission to access the client program, or particular services provided by the client program. A user policy 400 identifies attributes of the user for determining its authorization to access system resources including programs.

In a preferred embodiment, the program policy 390 for each program specifies a set of "roles" required to access the program. Each user recognized by the system is assigned to one or more "groups", each of which is given one or more roles. The user policy 400 for a user will specify the roles assigned to it.

If the SIM 310 has the current policy for the requesting program and the current user, the SIM directs the OpenSession request to the SPIM 330 specified by the policy for the requesting program (step 630).

If the SIM 310 does not have the current policies for the requesting program and the user, it performs the following steps. The SIM 310 requests and receives from the policy server program 350, via the network 110, program and user policies from the policy database 370, concerning the requesting program and user (step 640). Optionally, communication between the SIM 310 and the policy server program 350 may be done over a secure channel established using the Secure Sockets Layer protocol, described at www.netscape.com/products/security/ssl/protocol.html.

If the policy server program 350 returns no policy for the user (indicating that the policy server program is unable to authenticate the user) (step 642), the SIM refuses to open a new session and an error message is returned to the requesting program 200 (step 644), indicating an authentication failure for the user. Otherwise, the SIM proceeds to step 630.

(Authentication by the policy server program 350 advantageously supplements the authentication provided by the SKI 260. It is particularly useful in cases where the SKI 260 utilizes a third-party PKI certificate authority which does not instantaneously cancel PKI certificates in response to a customer request. By removing a user's policy from the policy database 370, an organization can prohibit access by a user immediately, without having to wait for a response from the third-party certificate authority.)

Once a new security services session has been successfully established between an requesting program and the SIM 310, the requesting program may request additional security services, such encryption, authorization, or digital signing, within the context provided by the newly created session. Requests for authorization are responded to in the SIM, according to the user and program policies provided by the policy server program 350, which responds by indicating whether a user is permitted to use a given resource according to policies obtained from the policy server program 350. Requests for SKI services 270 such as encryption or digital signing are directed by the SIM 310 to the appropriate SKI 260, according to the program policy 390 for the requesting program.

What SKI services the client program 240 chooses to access are entirely within the control of the client program 240, and are not limited by the method of the invention.

However, in a typical case, once a client program 200 has opened a communication session with an SKI 260 on a client 120, it will use the resulting session token to establish a secure connection with a server program 240 on a server 130. When the server program 240 receives such a request from the client program 200, it accesses the SKI services 270 necessary to establish the connection by making requests for SKI services to the ASIM 280 to which it is linked. ASIM 280 forwards these requests to a SIM 310 on server 130, which in turn forwards them to the SPIM 330 associated with a particular SKI 260, according to the program policy for the server program 240 retrieved by the SIM 310 from policy server program 350.

As can be seen, the above-described system is generic as to applications and as to SKIs. New security extensible applications can be added to the system by providing an appropriate ASIM and new SKIs can be added by adding appropriate SPIMS.

The present invention thus enables a set of security extensible applications, recognizing a possibly heterogeneous set of security services APIs, to be easily integrated with one or more SKIs 260 into a comprehensive data security system, providing flexible configuration and open-ended further extensibility.

Figure 12:
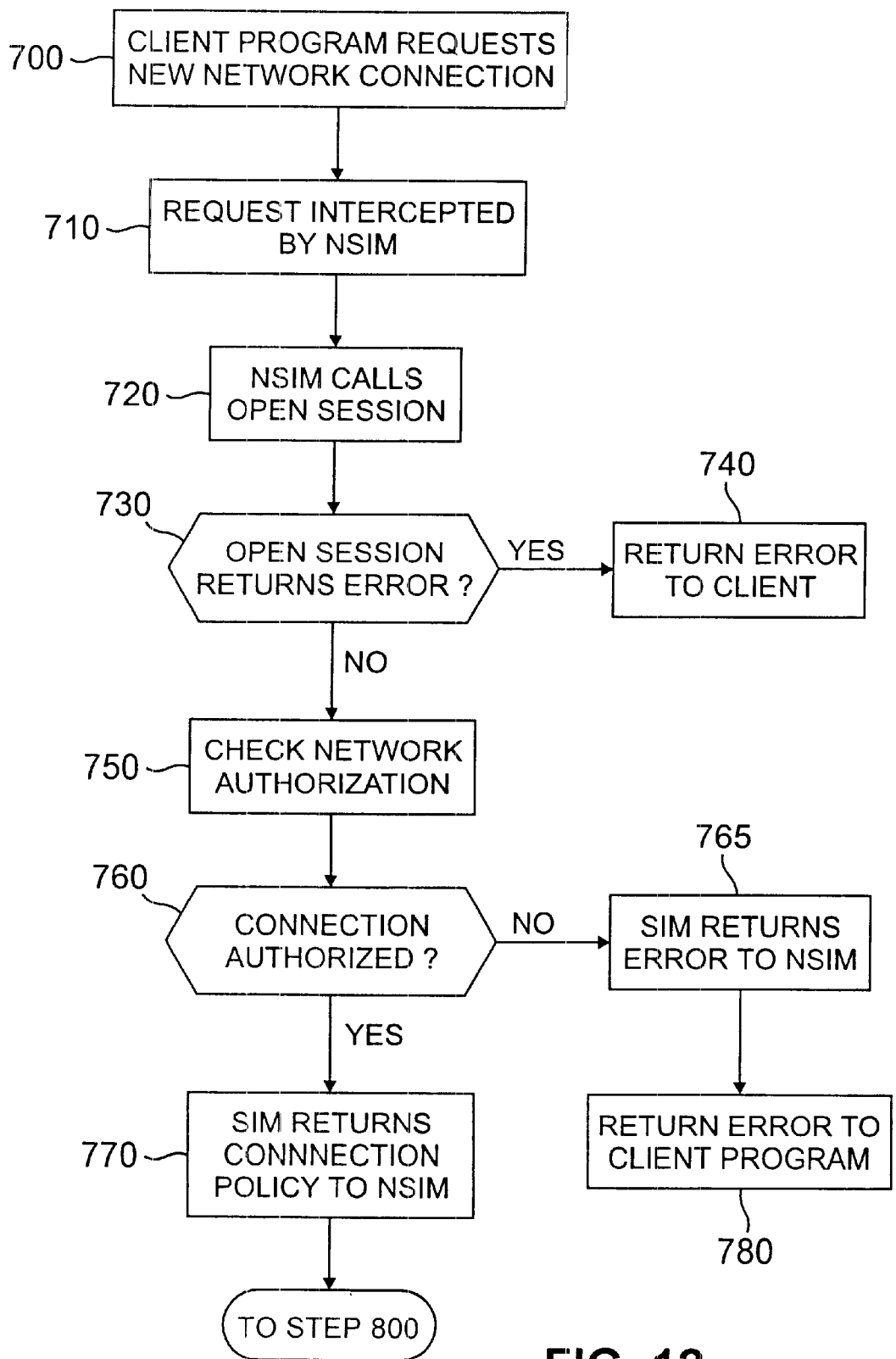

The operation of the invention with security non-extensible client and server programs will now be described, with reference to FIGS. 7, 8 and 12. As previously mentioned, security non-extensible client programs 210 and security non-extensible server programs 250 are linked to NSIMs through a network API 190. Accordingly, all network traffic emanating from these programs must pass through the NSIMs to which they are linked.

When a client program 210 on a client 120 attempts to access data or services on server 130, it does so by requesting a new network connection (e.g. by a call to the Winsock Connect function) (step 700). Since the client NSIM 290 has been substituted for network access module 180, the request is intercepted by the client NSIM 290 (step 710), which then performs the following steps. First, the client NSIM 290 calls the OpenSession procedure in the SIM API provided by the SIM 310 (step 720), using the client program name and username as arguments.

If the SIM refuses to open the new session (step 730) (indicating an inability to authenticate the user), the client NSIM 290 returns an error to the client program 210 in response to its request to open a new network connection (step 740). Otherwise, if the SIM opens the new session as requested, the client NSIM 290 calls the CheckNetworkAuthorization procedure in the SIM API, indicating the identities of the requesting host and the receiving host, as well as the port number of the requested connection (step 750). The SIM determines, by reference to the policies for the client program and for the user (that have already been retrieved from the policy server program 350), whether the user and client program are authorized to make the requested connection. If a connection is not authorized (step 760), the SIM returns an error message to the client NSIM 290 (step 765), otherwise it returns a connection policy 410 for the requested connection (step 770). A connection policy 410 specifies what roles a user is required to have to be authorized to access a particular host address and port, and also specifies what security measures (e.g. encryption, signing), if any, must be used to secure the connection. (Any authorized host and port pair to which a connection is permitted will have a policy associated with it in the policy database 370, either individually, or as a member of a class of host and port pairs). If the SIM 310 returns an error indicating that the requested connection is not authorized, the client NSIM 290 refuses to open the requested connection and returns an appropriate error response to the network API call from the client program (step 780).

Figure 13:
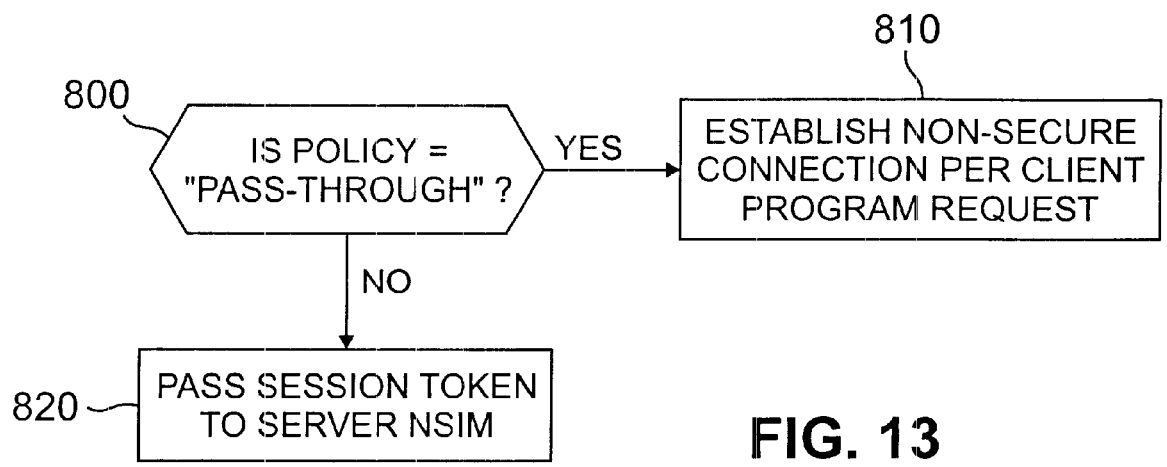

If the SIM returns a connection policy 410 (indicating that the connection is permitted), the client NSIM 290 proceeds to establish a connection in accordance with the policy. Referring now to FIG. 13, if the policy is "pass-through" (step 800), this indicates that the connection is to be made without any security features (e.g. because the host belongs to a third party that does not operate its servers according to the herein described methods, or because there is no record in the policy database 370 that the specified host has a particular server program connected to the specified socket).

In such a case, the NSIM establishes a non-secure network connection by calling procedures in the network access module 180 to which it is linked (step 810), and returns.

If a policy other than "pass-through" is returned by the SIM, this indicates that a server NSIM 300 is known to be listening at the requested port on the server 130. The client NSIM 290 will therefore pass the session token obtained from the prior call to OpenSession to the server NSIM 300 (step 820). The server NSIM will use the session token to authenticate the user and determine whether the connection should be permitted.

Figure 14:
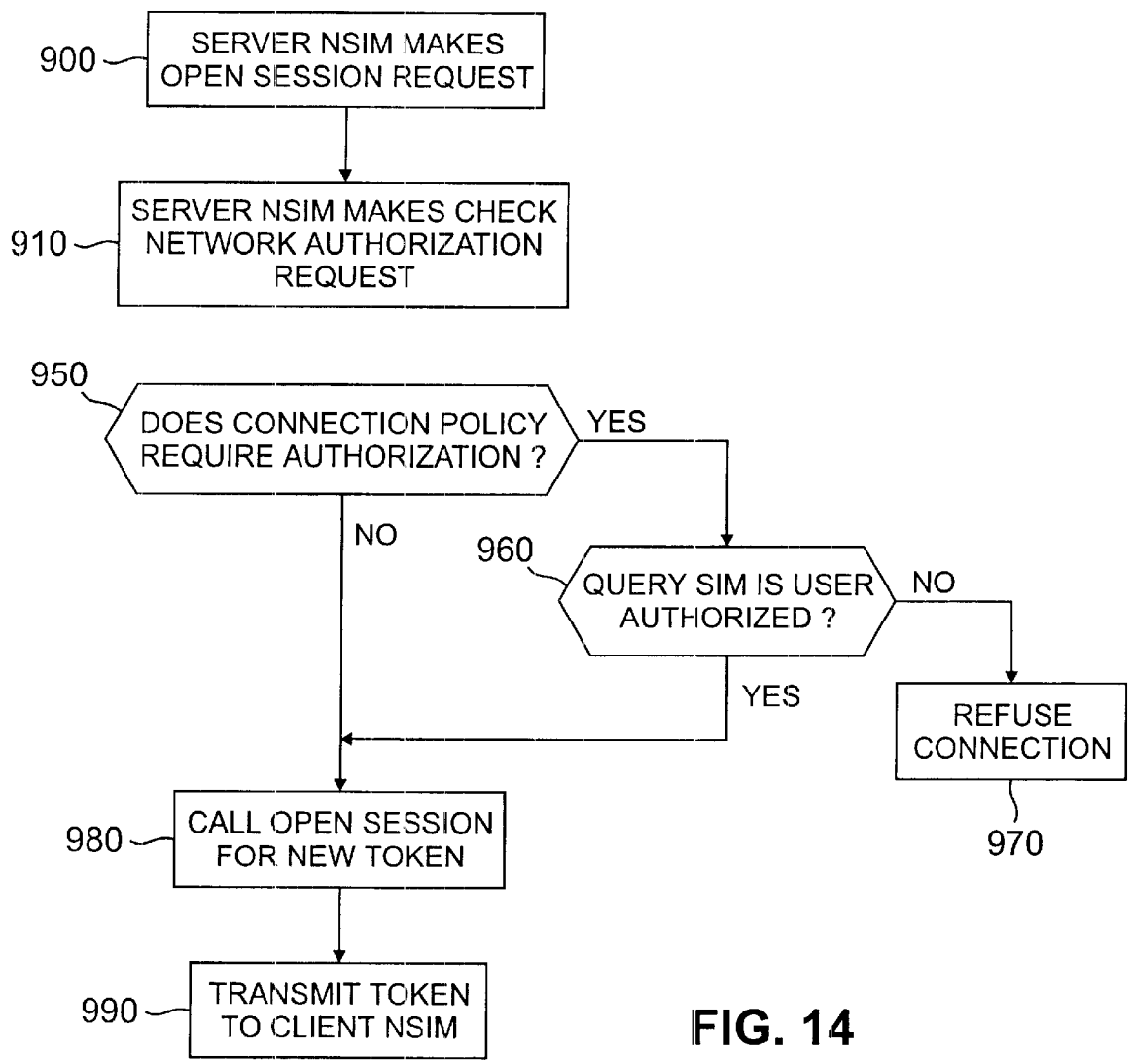

Referring now to FIG. 14, when a server NSIM 300 begins listening for network connection requests on network port on server 130, it starts by making a OpenSession request to SIM 310, providing its own network address and port as arguments (step 900). Once a session is successfully opened, it will use the CheckNetworkAuthorization procedure to determine the connection policy 410 applicable to its address and port (step 910).

When the server NSIM receives a request to open a connection, it determines whether the connection policy 410 for the server's port requires authorization (step 950). If so, the server NSIM 300 will query its local SIM 310 to determine whether the user on the client is authorized to access the server program. The SIM 310 returns an answer based on the program policy 390 for the server program and the user policy 400 for the user on client 120 (step 960). If the policy does not permit access, the server NSIM will refuse to establish the connection requested by the client-based NSIM (step 970).

If no authorization is required, or if the user is authorized, the server NSIM will make an OpenSession request to the SIM to obtain a new session token (step 980), which it will transmit to the requesting client NSIM 290 (step 990), thus authenticating itself, and providing a session key for further secure communication over the connection.

After a secure connection has been established between a client NSIM 290 and a server NSIM 300, the NSIMs insure that all subsequent communication through that connection is done according to the connection policy 410 for that connection. In particular, the policy will determine the security measures that must be taken when sending messages over the connection. These measures may include, for example, encryption and verification. Thus, when an NSIM receives a request to either send or receive a message over the connection, it applies the security measures required by the policy, by making appropriate procedure calls to the SIM API provided by the SIM on its local host.

Thus the present invention enables non-extensible programs to be easily integrated into an SKI-based security framework without any need to modify the programs themselves.

Figure 15:
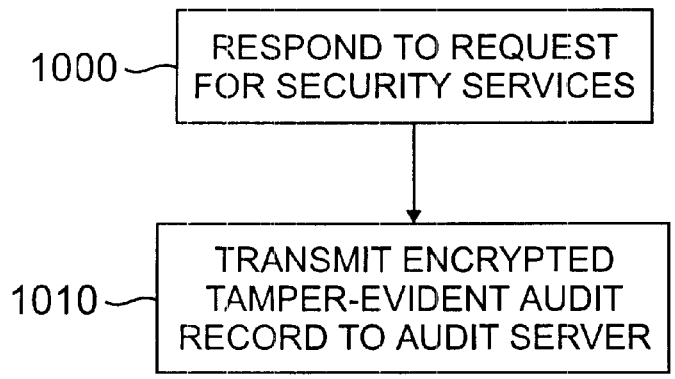

An additional feature of the invention relates to auditing the use and attempted use of SKI services. Referring now to FIG. 15, each time that a SIM 310 responds to a request for security services (either authorization or SKI services) from an ASIM 280, a client NSIM 290 or a server NSIM 300 (step 1000), it sends an audit record 420 to the audit server program 360, over a secure network connection (step 1100). The audit server program 360 stores the audit record 420 in the audit database 380. Each audit server record includes the date and time of the service request, the application and username making the request, the network address of the client or server on which the SIM is located, the nature of the request, and the outcome of the request (e.g. successful, not authorized, not authenticated, etc.). Each audit record is digitally signed and time-stamped by the SIM using standard cryptographic techniques to provide a tamper-evident log of all attempts to utilize SKI services. Such a log could be utilized to track down an attempted intruder by analyzing a pattern of attack, or as proof of the intruder's activities to be used in legal proceedings or the like.

Thus, the invention provides a secure and tamper-evident system for auditing the use of SKIs on a distributed computer system.

Preferred embodiments of the invention have been described. Nevertheless, it will be understood that various modifications may be made without departing from the spirit and scope of the invention. For example, although the audit server program and the policy server program are situated on a single security integration server in a preferred embodiment, the invention applies to systems having a audit server program and a policy server program located on separate servers. Accordingly, it is to be understood that the invention is not limited by the specific illustrated embodiment, but only by the scope of the appended claims.

What is claimed is:

1. A method for integrating a security key infrastructure with an application program on a computer system comprising:

transmitting a security key infrastructure service request to a security integration module that is characterized by having multiple security interfaces matched respectively to different security key infrastructures;

in the security integration module, retrieving a policy suitable for the application from a policy database;

in the security integration module, selecting a security key infrastructure to service the security key infrastructure service request according to the retrieved policy; and transmitting the security key infrastructure service request from the security integration module to the selected security key infrastructure, wherein the security key infrastructure service request is generated in a first network security interface module, linked to the application program, and wherein prior to practice of the method, the application program is linked to a network access module, and the method further comprising:

initially replacing the network access module with the network security integration module.

2. A method for securing a distributed data processing system having a client application program on a client, and a server application program on a server connected to the client by a network, comprising:

in the client:

intercepting, in a first network security interface module that is characterized by having multiple security interfaces matched respectively to different security key infrastructures, a request by the client application program to open a network connection to the server application program;

determining the current user of the client application program;

determining from a policy database whether the user is authorized to open the connection by reference to a policy in the database associated with the user and the client application program;

sending a message from the first network in module to the server requesting a secure network connection between the client application program and the server application program, only if the user is authorized by the policy to establish the connection; and in the server:
  in a second network security interface module, receiving the request from the first network security interface module to open a secure connection between the client application program and the server application program;
  determining whether the user is authorized to open a connection between the client application program and the server application program according to a user policy from a policy database;
  providing information to the first network security interface module necessary to establish a secure connection between the client application program and the server application program, only if the user is authorized by the user policy accessed by the server to open a connection between the client application program and the server application program;
  wherein, prior to practice of the method, the client application program is linked to a network access module, and further comprising:
    initially replacing the network access module with the first network security interface module.

3. A method for securing a distributed data processing system having a client application program on a client, and a server application program on a server connected to the client by a network, comprising:
  in the client:
    intercepting, in a first network security interface module that is characterized by having multiple security interfaces matched respectively to different security key infrastructures, a request by the client application program to open a network connection to the server application program;
    determining the current user of the client application program;
    determining from a policy database whether the user is authorized to open the connection by reference to a policy in the database associated with the user and the client application program;
    sending a message from the first network security interface module to the server requesting a secure network connection between the client application program and the server application program, only if the user is authorized by the policy to establish the connection; and
  in the server:
    in a second network security interface module, receiving the request from the first network security interface module to open a secure connection between the client application program and the server application program;
    determining whether the user is authorized to open a connection between the client application program and the server application program according to a user policy from a policy database;
    providing information to the first network security interface module necessary to establish a secure connection between the client application program and the server application program, only if the user is authorized by the user policy accessed by the server to open a connection between the client application program and the server application program;
    wherein the server application program is initially linked to a second network access module, and further comprising:
      initially replacing the network access module with the second network security interface module.

4. A computer program product, residing on a computer readable medium, for integrating a security key infrastructure with an application program on a computer system, the computer program product comprising instructions for causing a computer to perform the steps of transmitting a security key service request to a security integration module that is characterized by having multiple security interfaces matched respectively to different security key infrastructures; in the security integration module, retrieving a policy suitable for the application from a policy database; in the security integration module, selecting a security key infrastructure to service the security key service request according to the retrieved policy; and transmitting the security key service request from the security integration module to the selected security key infrastructure; for causing the computer to generate the security key service request in a first network security interface module, linked to the application program; and
  to initially replace the network access module with the first network security integration module.

* * * * *

UNITED STATES PATENT AND TRADEMARK OFFICE
CERTIFICATE OF CORRECTION

PATENT NO.    : 6,490,679 B1
DATED         : December 3, 2002
INVENTOR(S)   : Henry R. Tumblin et al.

It is certified that error appears in the above-identified patent and that said Letters Patent is hereby corrected as shown below:

Title page,
Item [73], Assignee replace "Waltham" with -- Needham --

Column 3,
Line 17, before "such" delete "."

Column 4,
Lines 45-46, replace "modules" with -- module in --

Column 7,
Line 37, replace "an" with -- a --

Column 9,
Line 14, replace "a" with -- an --

Column 10,
Line 16, replace "a" with -- an --

Signed and Sealed this

Twenty-ninth Day of July, 2003

JAMES E. ROGAN
*Director of the United States Patent and Trademark Office*